(12) United States Patent
Smith et al.

(10) Patent No.: US 7,073,545 B2
(45) Date of Patent: Jul. 11, 2006

(54) INFLATION AND DEFLATION APPARATUS

(76) Inventors: Mike L. Smith, 2915 Castle Valley Dr., Benton, AR (US) 72015; John R. Leszczyna, 2804 Cedar Creek Rd., North Little Rock, AR (US) 72116

( * ) Notice: Subject to any disclaimer, the term of this patent is extended or adjusted under 35 U.S.C. 154(b) by 245 days.

(21) Appl. No.: 10/817,356

(22) Filed: Apr. 2, 2004

(65) Prior Publication Data

US 2005/0087559 A1   Apr. 28, 2005

Related U.S. Application Data

(60) Provisional application No. 60/511,047, filed on Oct. 14, 2003.

(51) Int. Cl.
*B65B 1/04* (2006.01)

(52) U.S. Cl. .......................... 141/285; 141/38; 141/65; 141/114; 141/302; 137/228

(58) Field of Classification Search .................... 141/4, 141/10, 38, 65–68, 94–96, 83, 114, 192, 197, 141/285, 289, 290, 301, 302; 137/226, 228
See application file for complete search history.

(56) References Cited

U.S. PATENT DOCUMENTS 2,525,256 A * 10/1950 Byram ....................... 417/185

| | | | |
|---|---|---|---|
| 3,591,314 A | | 7/1971 | Day |
| 4,412,568 A | | 11/1983 | Hughes |
| 4,574,851 A | | 3/1986 | Lepisto |
| 5,437,301 A | | 8/1995 | Ramsey |
| 5,439,032 A | | 8/1995 | Petrone |
| 5,454,407 A | | 10/1995 | Huza et al. |
| 5,692,768 A | | 12/1997 | Mihm et al. |
| 5,806,110 A | | 9/1998 | Kunz et al. |
| 5,806,572 A | * | 9/1998 | Voller .......................... 141/10 |
| 5,906,227 A | * | 5/1999 | Sowry .......................... 141/65 |
| 5,947,168 A | | 9/1999 | Viard |
| 6,053,222 A | | 4/2000 | Peters |
| 6,516,536 B1 | | 2/2003 | Ryden |

OTHER PUBLICATIONS

BLOVAC High Performance Industrial Multi-Purpose Blow & Vacuum (product packaging); Blovac efficient and safe air products, P.O. Box 1395, Southport, Qld. 4215 Australia.

* cited by examiner

*Primary Examiner*—Timothy L. Maust
(74) *Attorney, Agent, or Firm*—J. Charles Dougherty

(57) ABSTRACT

A tool allowing both the inflation and deflation of air-filled bags such as dunnage bags is disclosed. The tool comprises rotatable controls to easily and safely manipulate both the flow of air into the device and the mode of operation between inflation and deflation. A venturi tube is used to draw air rapidly from a bag when the tool is deployed in deflation mode, while a radial vent system dissipates the force of the air exiting the device during deflation.

20 Claims, 5 Drawing Sheets

INFLATION AND DEFLATION APPARATUS

CROSS-REFERENCE TO RELATED APPLICATIONS

This application claims priority based on United States provisional patent application No. 60/511,047, filed on Oct. 14, 2003 and entitled "Inflation and Deflation Apparatus," which is incorporated herein by reference.

BACKGROUND OF THE INVENTION

The present invention relates to an apparatus for the inflation and deflation of air-filled bags, such as the dunnage bags commonly used to cushion cargo loads in truck trailers, railroad cars, and the like.

Inflatable dunnage bags are a common means of cushioning loads shipped via truck trailer, railroad car, or other typical shipping container, particularly where the cargo only partially fills the container and shifting during transport might cause damage. Typical dunnage bags in use today are constructed of one or more layers of paper surrounding a plastic lining. The paper serves to protect the bags from tearing, and thus a greater number of layers may be used in applications where the risk of damage to the dunnage bag is greater. A valve for filling the dunnage bag is attached through a hole cut in the bag during manufacture. The bags are shipped flat from the manufacturer, and must be inflated by shipping personnel as containers are loaded with cargo.

The tools currently in use to fill dunnage bags with air are often simply converted tire inflation tools, which are attached to a hose leading from a source of compressed air. Some specialized tools are available for dunnage bag deflation,. such as taught by U.S. Pat. No. 5,437,30to Ramsey. In the use of such devices, the bag is first placed in the space that it will occupy as cargo is loaded into a container, and the inflation device is attached to the bag valve. The bag is then filled with air until an appropriate air pressure within the bag is achieved. The inflation tool may connect with the bag valve through a ball-lock quick-disconnect attachment, which may be engaged and disengaged by simply sliding a ring on the attachment point up or down. Filling is thus a relatively simple operation, requiring only a few seconds of the operator's time.

A significant limitation of the current inflation tools is that they present no way to rapidly deflate a dunnage bag. The valve assembly in some such bags may be unscrewed to release air pressure within the bag, but because the bags are fairly rigid (owing to the protective paper covering) they tend not collapse simply due to the equalization of air pressure inside and outside the bag. The bags cannot be quickly and conveniently reduced to a flat configuration such as they are shipped from the manufacturer. As a result, the standard industry practice is for shipping and receiving personnel to simply cut the bags with a utility knife in order to deflate them.

Dunnage bags are not reusable once cut, and thus they are generally considered to be a disposable commodity. Significant cost savings could be realized by the reuse of these dunnage bags. This could be rendered practical by devising a means to rapidly and easily deflate a dunnage bag without damaging the dunnage bag. The bags must be restored to the flat shape they held prior to their original use, so that they can be easily and compactly stored.

The prior art does include previous attempts to develop deflation tools for dunnage bags. U.S. Pat. No. 5,437,301 to Ramsey, discussed above, teaches a rotating valve actuator that selectively allows the flow of compressed air across an air passage connected to the dunnage bag in order to facilitate deflation. U.S. Pat. No. 6,053,222 to Peters teaches a dunnage bag deflation tool that uses a high-pressure air source to open the dunnage bag air-valve, thereby allowing deflation, and also suck air out of the bag by discharging the air through a venturi tube. A venturi tube in its simplest form is an air passage with a region of restricted diameter. According to the Bernoulli inverse relationship between air velocity and pressure, passage of air through the restricted region of a venturi tube creates a low-pressure region. This low-pressure region results in a suction effect that may be used to draw air out of an attached container. Peters teaches two different embodiments of the deflation device, which differ by the means through which the device may be switched from inflation to deflation mode. One device calls for the operator to simply place a thumb over the venturi tube exit, thereby blocking that means of egress for the high-pressure air and directing the high-pressure air into the bag. The other embodiment incorporates a manually set bi-stable switch set at the entrance to the venturi tube, which prevents air from ever entering the venturi tube and thus forcing high-pressure air in the direction of the dunnage bag valve.

U.S. Pat. No. 5,454,407 to Huza et al. teaches another apparatus to both inflate and deflate a dunnage bag. This device incorporates the venturi effect as part of an automatic pressure sensing system, but relies on hand pressure directly to the dunnage bag for deflation. Other devices to inflate and deflate different types of chambers are known in the art, such as that taught by U.S. Pat. No. 5,947,168 to Viard for inflation and deflation of an air mattress.

Each of these devices suffers from important limitations. While the Peters device allows for the inflation and deflation of a dunnage bag using an integrated tool, its control mechanisms are of limited practicality. The operator of such a device should ideally be able to quickly turn on and off the source of high-pressure air, and quickly adjust the mode setting of the device to either inflate or deflate a dunnage bag. Ideally, the necessary controls would be simple and easily manipulated. The use of the operator's thumb to maintain the Peters device in the inflation mode would quickly result in operator fatigue. Given the large number of cargo containers that may be loaded and unloaded in a typical shipping facility during an operator's work shift, this rudimentary control mechanism would quickly prove unworkable. The use of a switch at the entrance of the venturi tube is an improvement, but because of its design and position on the device would be prone to failure. The device does not incorporate any convenient means by which to switch on and off the flow of high-pressure air; presumably such a control must be incorporated into the hose feeding the device, or at the connection point for the hose to the high-pressure air source. Furthermore, the overall design of the device lacks any means of dissipating the flow of high-pressure air out of the venturi tube during deflation of a dunnage bag; it would result in a violent burst of air moving directly toward the operator. This situation raises significant safety concerns. Finally, the design of the device does not incorporate any convenient means of holding the device during inflation and deflation; this is an important safety concern as well, since if the valve connection should fail then the device would be propelled backward at great speed due to force of air. In this situation, the device would likely swing in an arc due to the attached (but flexible) air hose, and could strike the operator or a bystander With great force, potentially causing severe injury.

The limitations of the prior art are overcome by the present invention as described below.

BRIEF SUMMARY OF THE INVENTION

The present invention comprises an inflation and deflation device with a control mechanism and operational features that make it convenient, practical, and safe for use by operating personnel. The user activates and deactivates the flow of air through the device by a simple rotational or twisting motion, which opens a pathway between the air channel input and the air flow path through the main chamber of the device. The user can thus turn the device on quickly and easily, without releasing his or her grip on the device. The on/off control is independent of whether the device is operating in inflation or deflation mode. Further, switching of the device from an inflation to a deflation mode is achieved by merely twisting the end cap of the device. This mechanism results is a simple and reliable means by which the operator may change the mode of operation of the device. Air exiting the rear of the device is dissipated in a radial manner, in order to reduce the likelihood of injury to the operator due to a violent rush of air during deflation.

It is therefore an object of the present invention to provide for a single, integrated tool for the inflation and deflation of dunnage bags and like containers.

It is a further object of the present invention to provide a device for the inflation and deflation of air-filled bags with all necessary controls conveniently integrated into the device for ease of use.

It is also an object of the present invention to provide a device for the inflation and deflation of air-filled bags that disperses air ejected from the device during deflation mode.

It is also an object of the present invention to provide a device for the inflation and deflation of air-filled bags that improves on the safety of existing devices.

These and other features, objects and advantages of-the present invention will become better understood from a consideration of the following detailed description of the preferred embodiments and appended claims in conjunction with the drawings as described following:

DETAILED DESCRIPTION OF THE INVENTION

Figure 1:
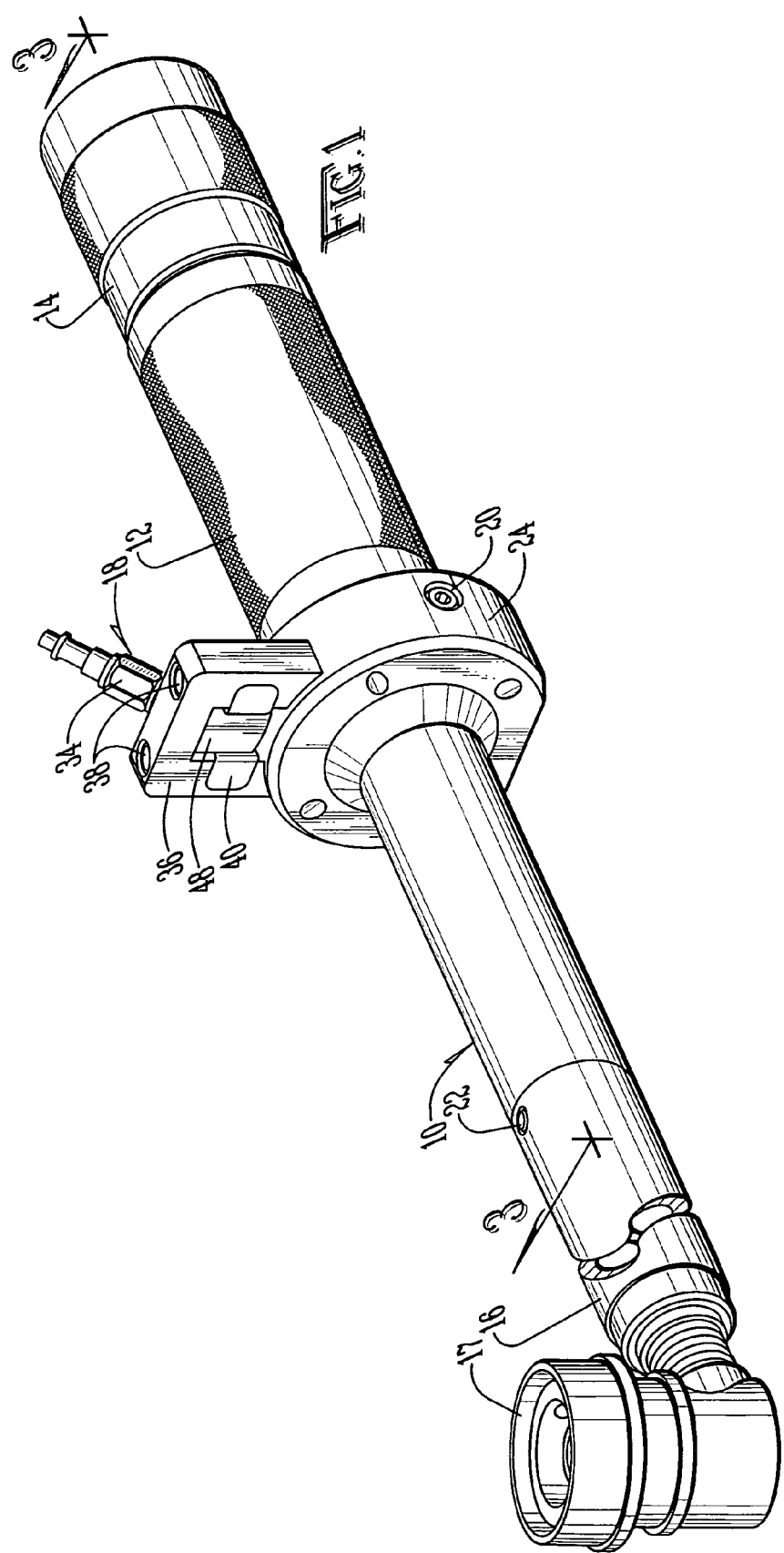
FIG. 1 is a perspective view of a preferred embodiment of the present invention.
Figure 2:
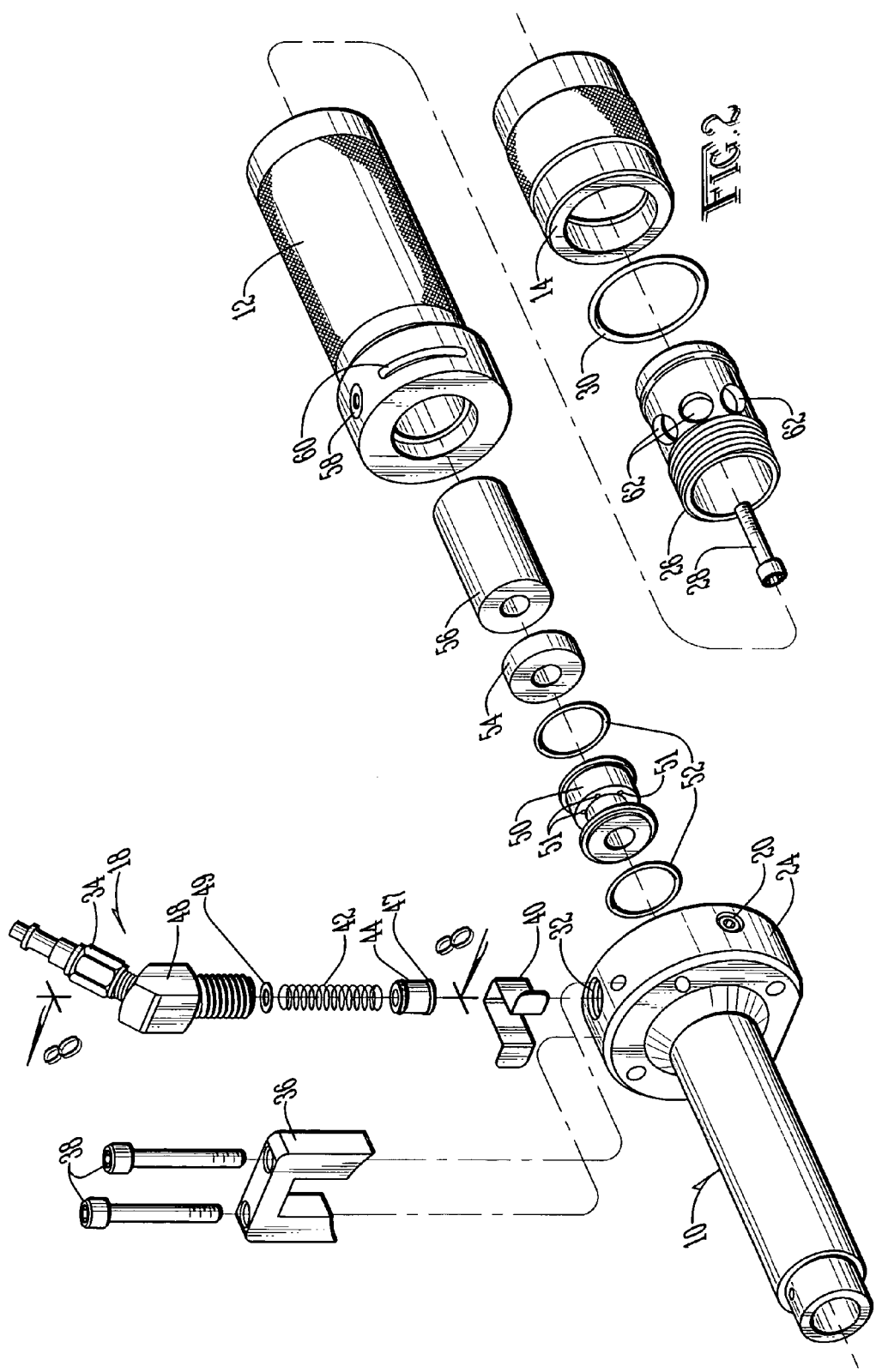
FIG. 2 is an exploded perspective view of a preferred embodiment of the present invention.

Referring to FIGS. 1 and 2, the major components of a preferred embodiment of the present invention may now be described. Barrel 10 comprises a tube with an open bore that is preferably integrated with barrel housing 24. Attached to barrel 10 using set screw 22 is barrel extension 16, also comprising an open bore. Alternatively, barrel 10 and barrel extension 16 could be manufactured as a single part. Attached to barrel extension 16 is valve connector assembly 17. Valve connector assembly 17 is fashioned so as to provide a selectively lockable and unlockable engagement with a dunnage bag inflation valve (not shown). The valve connector assembly 17 may preferably be constructed as a ball-lock quick-disconnect valve connector as described in U.S. Pat. No. 5,437,301 to Ramsey, which is incorporated herein by reference.

Handle 12 is fitted to barrel housing 24 such that handle 12 fits within barrel housing 24 at its proximal end, and may rotate longitudinally within barrel housing 24. Two set screws 20 (one of which is shown in FIG. 1) are used to hold handle 12 in place within barrel housing 24, but also allow limited axial rotation of handle 12 within barrel housing 24 in order to control air flow, as will be described in greater detail below. Connected to handle 12 is diffuser 26, and threadably connected to diffuser 26 is cap 14. Cap 14 and diffuser 26 preferably incorporate steeply angled threads so that cap 14 may be opened and closed with respect to the device with only limited rotation. The travel of cap 14 with respect to diffuser 26 is limited by cap screw 26, such that it stops at the fully open position, that is, when vents 62 are fully exposed. Cap o-ring 30 is seated circumferentially around diffuser 26, and fits snugly between handle 12 and cap 14 when cap 14 is in the closed position. Cap o-ring 30 prevents leakage of air between diffuser 26 and cap 14 when cap 14 is in the closed position.

Air hose connector assembly 18 is attached to barrel housing 24, allowing air to flow from a compressed air source hose (not shown) through barrel housing air passage 32. Air hose connector assembly 18 is comprised of air fitting 34, which preferably includes a connector designed to fit a standard quick-disconnect female air hose connector. In the preferred embodiment, nipple 46 is attached to air fitting 34 using 45-degree elbow fitting 48, thereby altering the angle of attachment of the air hose to the device to improve ergonomics. Alternatively, any other fitting type or angle might be selected for ease of use depending upon the desired configuration. Coupling 44 fits snugly within nipple 46, and is biased radially downwardly away from fitting 48 and toward barrel housing 24 by spring 42. The bias created by spring 42 causes a firm connection to maintain between coupling 44 and the exterior of the distal end of barrel housing 24, thus ensuring a leak-free passage of air through the device as further explained below. Coupling 44 may preferably include a lip at its proximal end that stops its travel Within nipple 46. Further in the preferred embodiment, top coupling o-ring 45 and bottom coupling o-ring 47 provide an air-tight seal between coupling 44 and the inner wall of nipple 46 and barrel housing 24, respectively. Coupling washer 49 supports the distal end of spring 42 within fitting 48. Air hose connector assembly 18 further preferably comprises U-shaped support cage 36, which fits over and around air fitting 34 and is attached to barrel housing 24 using support screws 38. U-shaped bracket 40 fits within support cage 36 and extends around air fitting 34 perpendicular to support cage 36.

Fitted annularly within the bore of handle 12 is air distributor 50. distributor o-rings 52 are placed at either end of distributor 50 to block the flow of air around either end of distributor 50 at the inner wall of the bore of handle 12. Preferably, the proximal distributor o-ring 52 forms an air-tight seal between distributor. 50 and barrel housing 24 as well, fitting snugly within an annular groove on the outer edge of the proximal face of distributor 50. Distributor 50 further comprises a number of distributor inlets 51; the preferred embodiment comprises six distributor inlets 51, three of which are shown in FIG. 2, but alternative embodiments may include any number of such inlets 51. Inlets 51 are preferably located at the edge of the base of the truncated cone formed by the inner portion of distributor 50 at its proximal end. As will be explained more fully below, air may pass through barrel housing air passage 32 through distributor inlets 51 to enter distributor 50 and thereby pass through the device.

Fitted at the distal end of distributor 50 and engaging with the distal distributor o-ring 52 is spacer 54. Spacer 54 is preferably of an annular shape with a bore of uniform diameter. Fitted co-axially and distally to spacer 54 is volumizer 56. Volumizer 56 comprises an interior of a truncated cone or frustoconical shape, the apex of the cone positioned at the proximal end of volumizer 56. In an alternative embodiment, spacer 54 and volumizer 56 could be formed of a single integrated part. In another alternative embodiment, spacer 54 could be omitted altogether.

Barrel 10, handle 12, and cap 14 may be formed of any sufficiently strong, rigid material, the stronger plastics being the preferred material due to their light weight and relatively low manufacturing cost. Likewise, distributor 50, spacer 54, and volumizer 56 may also be constructed of strong, lightweight materials such as plastics. For purposes of strength, brass or other metals are used in the preferred embodiment for the construction of diffuser 26, nipple 46, bend fitting 48, and air fitting 34. The various o-rings in the preferred embodiment are of the types commonly found commercially, constructed of rubber or a like resilient material. Further in the preferred embodiment, support cage 36 is constructed of aluminum for both strength and weight savings, while bracket 40 and spring 42 are formed of steel for resiliency.

Figure 5:
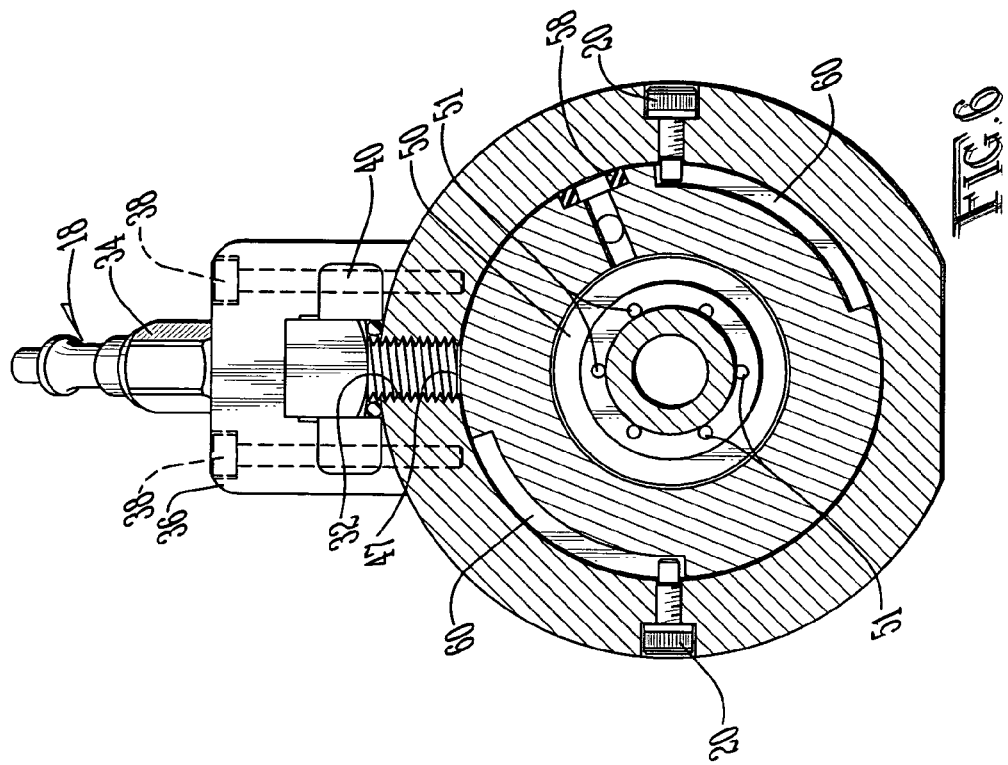
FIG. 5 is a cut-away view of the preferred embodiment of the present invention, cut along line "5" in FIG. 3.
Figure 6:
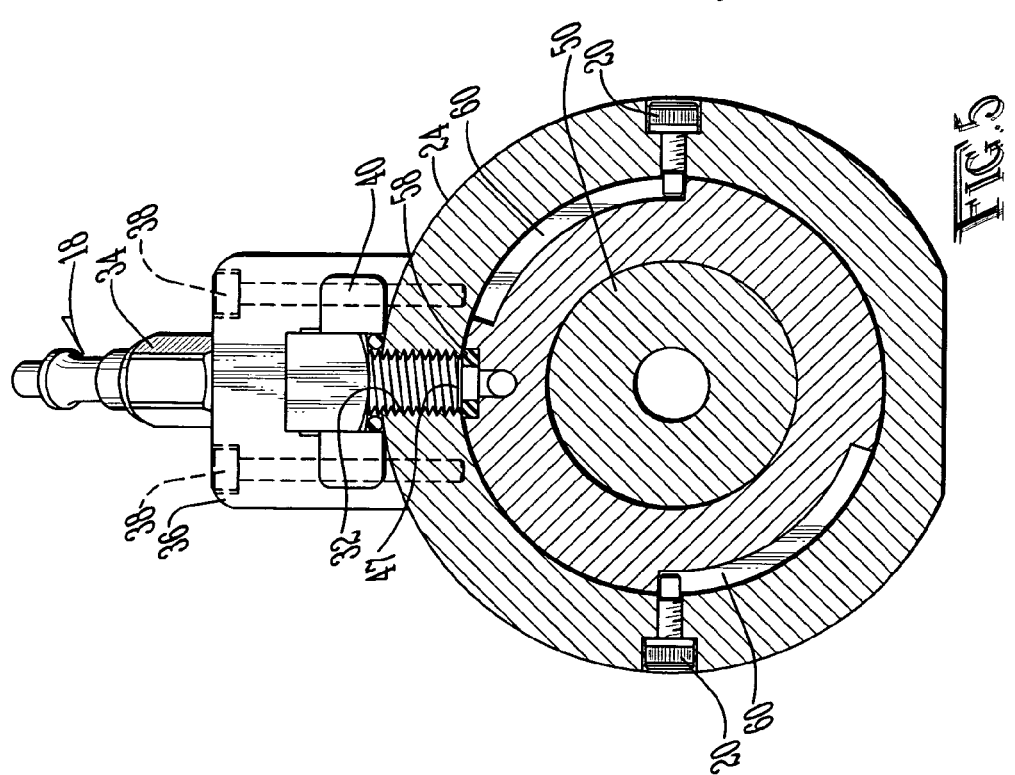
FIG. 6 is a cut-away view of the preferred embodiment of the present invention, cut along line "6" in FIG. 4.

Referring now to FIGS. 5 and 6, the method of turning a preferred embodiment of the present invention "on" and "off" (that is, allowing the flow of compressed air through the device or stopping the flow of compressed air through the device) may be described. Handle 12 fits within barrel housing 24 such that it may rotate about the common central axis of those two parts. In FIG. 6, handle 12 is shown turned with respect to barrel housing 24 such that the device is in the "off" position. Handle 12 is rotated such that handle air passage 58 is not aligned with air hose connector assembly 18, and thus air cannot flow from air hose connector assembly 18 (which is connected to the hose supplying high-pressure air) through handle air passage 58 into the bore of the device.

In FIG. 5, handle 12 is shown turned with respect to barrel housing 24 such that the device is in the "on" position. Handle 12 is now rotated such that handle air passage 58 is aligned with air hose connector assembly 18, allowing air to flow from air hose connector assembly 18 through handle air passage 58 and into the bore of the device. It will be seen in both FIGS. 5 and 6 that handle set screws 20 extend though the wall of barrel housing 24 and fit into handle slots 60. Set screws 20 thus limit the travel of rotation of handle 12 with respect to barrel housing 24, and provide a positive stop when the "on" position shown in FIG. 5 is reached. In the preferred embodiment, external markings and wording. (not shown) may be used to indicate the direction of turn for handle 12 in order to reach the "on" and "off" positions, and may further be used to indicate the precise limits of rotation travel represented by these positions. It will also be seen that set screws 20 serve to hold handle 12 in place within barrel housing 24. Although two set screws 20 are used in the preferred embodiment, alternative embodiments could well use any other number of set screws 20.

Figure 3:
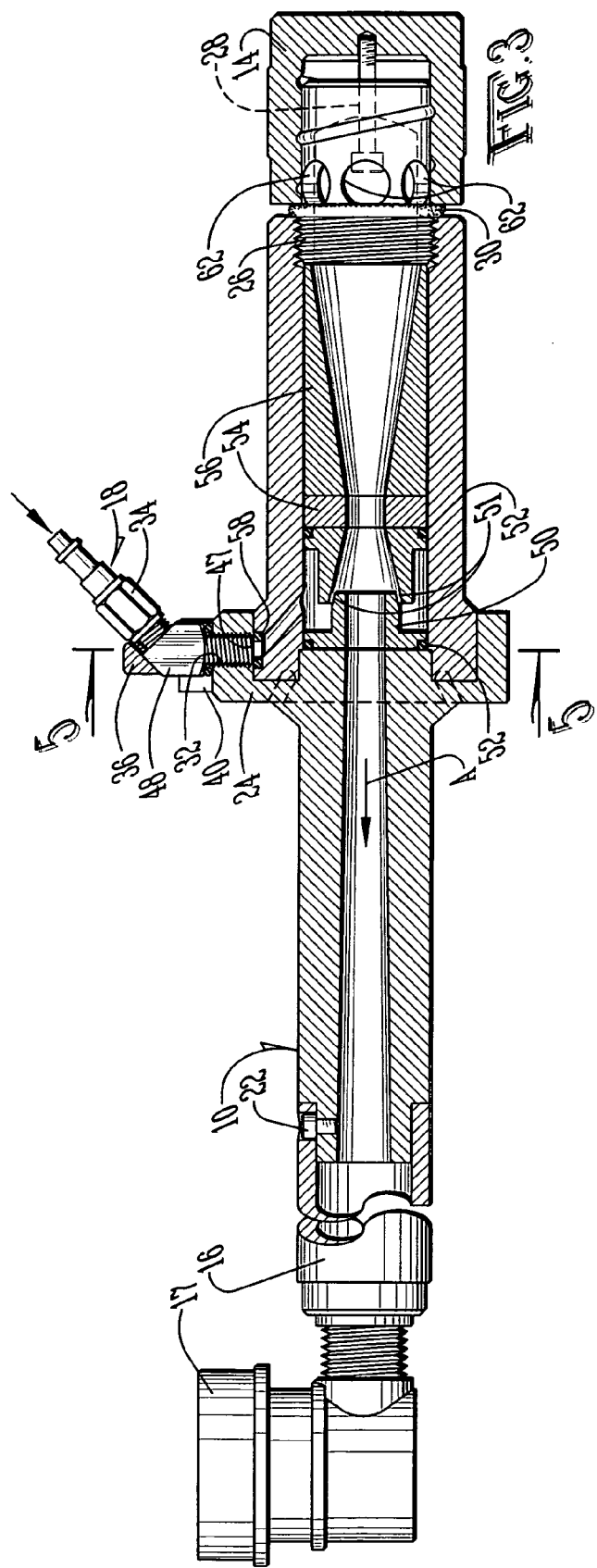
FIG. 3 is a partial cut-away elevational view of a preferred embodiment of the present invention in the "on" configuration, cut along line "3" in FIG. 1.
Figure 4:
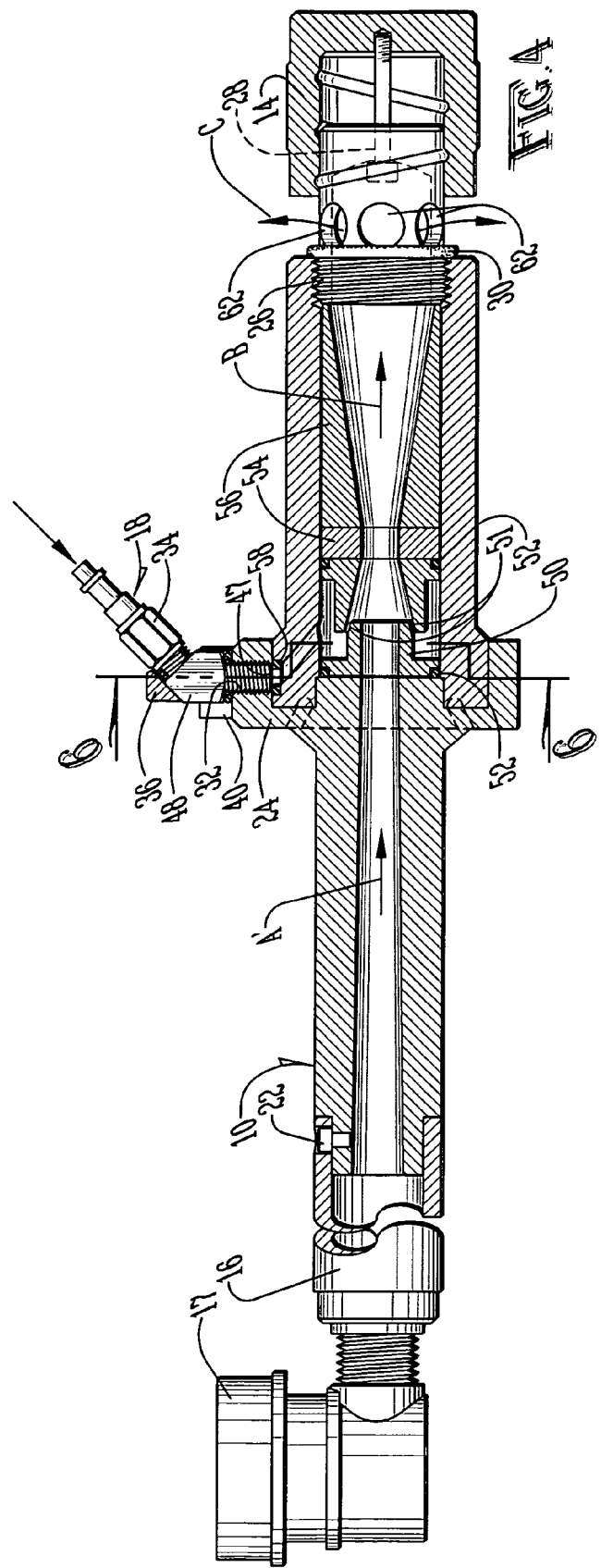
FIG. 4 is a partial cut-away elevational view of a preferred embodiment of the present invention in the "off" configuration.

Referring now to FIGS. 3 and 4, the method of moving the preferred embodiment of the invention between inflation mode and deflation mode may now be described. The device is shown in inflation mode in FIG. 3. Cap 14 is rotated along its threads to fit tightly against the dorsal end of handle 12 on diffuser 26 at cap o-ring 30, thereby sealing vents 62 on diffuser 26 closed from the outside air. Because air cannot flow through vents 62, compressed air entering air hose connector assembly 18 and passing into the bore of the device may instead flow in the direction of arrow A through barrel 10, barrel extension 16,.through bag valve connector assembly 17, and into a previously deflated or previously unused dunnage bag (not shown).

FIG. 4 depicts the preferred embodiment of the invention in deflation mode. As shown in the figure, cap 14 is open with respect to handle 12, that is, threaded outwardly on diffuser 26 to the extent of its travel as limited by cap screw 28, thereby allowing vents 62 on handle cap diffuser 26 to be exposed to the outside environment. Thus as air travels from the compressed air source and through air hose connector assembly 18, it may travel in the direction of arrow B through volumizer 56, then out vents 62 in the direction of arrows C. Because in the preferred embodiment there are numerous vents 62 spaced at intervals around the circumference of diffuser 26, the pressurized air exiting through vents 62 is reduced in force to avoid operator injury.

The operation of the device to deflate dunnage bags may also be described in reference to FIG. 4. As previously indicated, air is forced through air hose connector assembly 18 into the device. The air enters the device bore through distributor pinholes 51. The air is then drawn in the direction of arrow B by the reduced pressure created in distributor 50; the decreasing diameter of distributor 50 results in the creation of a reduced pressure region through the well-known Bernoulli principle. This reduced pressure thus draws the air through distributor 50, spacer 54, and volumizer 56, and finally out of the device through vents 62. Air from the dunnage bag is drawn in the direction of distributor 50, passing from the dunnage bag, through bag valve connector assembly 17, barrel extension 16, barrel 10, and into distributor 50. From there the air from the dunnage bag is ejected from the device with the compressed air from air hose connector assembly 18. Using typical compressed-air sources such as industrial-sized air compressors, the preferred embodiment of the device can reduce a standard-sized dunnage bag to a flat shape appropriate for storing and reuse in only a few seconds.

The present invention has been described with reference to certain preferred and alternative embodiments that are intended to be exemplary only and not limiting to the full scope of the present invention as set forth in the appended claims.

What is claimed is:

1. An inflation and deflation apparatus, comprising:
 (a) an air channel, wherein said air channel comprises an air channel bore;
 (b) a compressed air inlet in communication with said air channel;
 (c) an air chamber rotatably connected to said air channel, wherein said air chamber comprises an air chamber bore and an air chamber passage, and wherein said air chamber is operable to rotate such that said compressed air inlet and said air chamber passage are in alignment whereby compressed air may pass from said compressed air inlet through said air chamber passage; and (d) a cap assembly attached to said chamber, wherein said cap is operable to selectively open and close an air outlet from said air chamber passage through said air chamber bore.

2. The apparatus of claim 1, further comprising a diffuser attached to said chamber and engaged with said cap, wherein said cap is operable to selectively open and close said diffuser and thereby open said air outlet whereby air may flow from said air passage through said chamber.

3. The apparatus of claim 2, wherein said diffuser comprises a plurality of vents spaced at intervals around the surface of said diffuser and extending radially outward from the longitudinal axis of said diffuser.

4. The apparatus of claim 3, wherein said cap is threadably engaged with said diffuser, and said cap is rotatably operable to selectively open and close said vents of said diffuser.

5. The apparatus of claim 2, further comprising a venturi tube within said chamber bore.

6. The apparatus of claim 5, further comprising a valve connector assembly attached to said air channel, wherein said valve connector assembly is operable to releaseably engage a valve.

7. The apparatus of claim 5, wherein said venturi tube comprises a frustoconical bore.

8. The apparatus of claim 7, further comprising at least one venturi tube inlet passing through said venturi tube and allowing air to flow between said air inlet and said venturi tube bore.

9. The apparatus of claim 8, further comprising a volumizer between said venturi tube and said diffuser and within said chamber bore.

10. The apparatus of claim 6, further comprising an air inlet connector in communication with said air inlet, wherein said air inlet connector is adapted to receive an air hose.

11. The apparatus of claim 10, further comprising a coupling fitted telescopically within said air inlet connector, wherein said coupling is resiliently biased against said chamber in alignment with said air passage.

12. The apparatus of claim 11, wherein said coupling comprises a top end and a bottom end, and wherein said apparatus further comprises a coupling top o-ring annularly attached near said top end of said coupling and circumscribing said coupling, and said bottom o-ring is annularly attached at said bottom end of said coupling such that said bottom o-ring is in resilient contact with said chamber in alignment with said air-passage.

13. The apparatus of claim 11, further comprising a spring within said air inlet connector, said spring biasing said coupling away from said air inlet connector and toward said chamber.

14. An inflation and deflation apparatus:, comprising:

(a) an elongated barrel comprising an open barrel bore;
(b) an elongated handle comprising an open handle bore and a handle air passage extending radially through said handle and connecting to said handle bore; and
(c) a housing connected to said barrel and circumscribing at least a portion of said handle, wherein said housing comprises a housing air inlet extending radially through said housing, and wherein said handle is operable to rotate with respect to said barrel housing such that said air inlet is in alignment with said air passage to allow compressed air to pass through said air inlet into said handle bore.

15. The apparatus of claim 14, further comprising a diffuser attached to said handle, wherein said diffuser comprises at least one air passage whereby air may escape from said handle bore.

16. The apparatus of claim 15, further comprising a cap operable to open and close said air passage.

17. The apparatus of claim 16, wherein said air passage comprises a plurality of vents spaced along said diffuser, and wherein said cap is threadably engaged with said diffuser.

18. The apparatus of claim 16, further comprising a frustoconical tube within said handle, wherein said frustoconical tube comprises a base and an apex, and said frustoconical tube comprises at least one air opening to allow air to pass from said air passage though said frustoconical tube, wherein said barrel bore is in pneumatic communication with said base of said frustoconical tube, and wherein said diffuser is in pneumatic communication with said apex of said frustoconical tube.

19. The apparatus of claim 18, further comprising a volumizer positioned between said frustoconical tube and said diffuser, and wherein said volumizer is in pneumatic communication with said apex of said frustoconical tube and said diffuser.

20. The apparatus of claim 16, further comprising a valve connector attached to said barrel and in pneumatic communication with said barrel bore, wherein said valve connector comprises releasable means to engage a valve.

* * * * *